US009783201B2

(12) United States Patent
Heinrich et al.

(10) Patent No.: US 9,783,201 B2
(45) Date of Patent: Oct. 10, 2017

(54) METHOD AND DEVICE FOR AN OVERTAKING ASSISTANT

(71) Applicant: Conti Temic microelectronic GmbH, Nuremberg (DE)

(72) Inventors: Stefan Heinrich, Achern (DE); Stefan Hegemann, Wangen (DE); Marc Fischer, Nonnenhorn (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 14/779,130

(22) PCT Filed: Mar. 11, 2014

(86) PCT No.: PCT/DE2014/200120
§ 371 (c)(1),
(2) Date: Sep. 22, 2015

(87) PCT Pub. No.: WO2014/154214
PCT Pub. Date: Oct. 2, 2014

(65) Prior Publication Data
US 2016/0059858 A1    Mar. 3, 2016

(30) Foreign Application Priority Data
Mar. 27, 2013   (DE) ........................ 10 2013 005 248

(51) Int. Cl.
*B60Q 1/00*    (2006.01)
*B60W 30/18*   (2012.01)
*G08G 1/16*    (2006.01)
*B60W 40/04*   (2006.01)
*G01S 13/93*   (2006.01)

(52) U.S. Cl.
CPC ...... *B60W 30/18163* (2013.01); *B60W 40/04* (2013.01); *G08G 1/167* (2013.01); *G01S 2013/9325* (2013.01)

(58) Field of Classification Search
CPC .............................. B60W 30/18; B60W 40/04
USPC ........................................................ 701/23
See application file for complete search history.

(56) References Cited

U.S. PATENT DOCUMENTS

| | | | |
|---|---|---|---|
| 5,521,579 A * | 5/1996 | Bernhard ........... | B60K 31/0008 180/167 |
| 6,269,308 B1 | 7/2001 | Kodaka et al. | |
| 7,091,838 B2 | 8/2006 | Shimakage | |
| 7,289,059 B2 | 10/2007 | Maass | |
| 7,411,486 B2 | 8/2008 | Gern et al. | |
| 8,457,359 B2 | 6/2013 | Strauss et al. | |
| 8,466,806 B2 | 6/2013 | Schofield | |
| 8,615,357 B2 * | 12/2013 | Simon ................... | B60W 30/16 340/435 |
| 8,636,393 B2 * | 1/2014 | Schofield ............ | B60Q 1/1423 362/464 |
| 8,665,079 B2 * | 3/2014 | Pawlicki ................... | G06T 7/73 340/435 |
| 8,700,251 B1 * | 4/2014 | Zhu .......................... | G05D 1/02 701/25 |
| 2001/0016798 A1 | 8/2001 | Kodaka et al. | |
| 2006/0152346 A1 | 7/2006 | Maass et al. | |
| 2008/0201050 A1 * | 8/2008 | Plack .................... | B60W 10/06 701/70 |
| 2011/0313665 A1 * | 12/2011 | Lueke ................... | G01S 13/931 701/301 |
| 2012/0296522 A1 * | 11/2012 | Otuka ................... | G08G 1/167 701/41 |
| 2013/0338868 A1 * | 12/2013 | Essame ............ | B60W 30/18163 701/23 |
| 2014/0172221 A1 * | 6/2014 | Solyom .............. | B62D 15/0285 701/23 |
| 2016/0059858 A1 * | 3/2016 | Heinrich ......... | B60W 30/18163 701/23 |

FOREIGN PATENT DOCUMENTS

| | | |
|---|---|---|
| DE | 43 13 568 | 6/1994 |
| DE | 102006020631 | 11/2007 |
| DE | 102011016770 | 11/2011 |
| DE | 102012001405 | 11/2012 |
| EP | 1 346 877 | 9/2003 |
| EP | 1 958 840 | 8/2008 |
| JP | 2009-023399 A | 2/2009 |
| WO | WO 2004/094186 | 11/2004 |

OTHER PUBLICATIONS

International Search Report of the International Searching Authority for International Application PCT/DE2014/200120, mailed Jul. 22, 2014, 2 pages, European Patent Office, HV Rijswijk, Netherlands.
PCT International Preliminary Report on Patentability including English Translation of PCT Written Opinion of the International Searching Authority for International Application PCT/DE2014/200120, issued Sep. 29, 2015, 8 pages, International Bureau of WIPO, Geneva, Switzerland.
German Search Report for German Patent Application No. 10 2013 005 248.3, dated Sep. 5, 2013, 5 pages, Muenchen, Germany, with English translation, 5 pages.

* cited by examiner

*Primary Examiner* — Thomas G Black
*Assistant Examiner* — Wae Louie
(74) *Attorney, Agent, or Firm* — W. F. Fasse

(57) ABSTRACT

A method for an overtaking assistant for a vehicle is provided. The vehicle is equipped with environment sensing systems for detecting objects in the own and an adjacent lane on the sides and at the rear of the vehicle. The space in front of the vehicle is preferably detected by environmental sensors as well. Autonomous cutting into an adjacent lane is only initiated if a first vehicle is detected in the adjacent lane. The first vehicle is taken as a reference for a speed of vehicles in the passing lane. It is also assumed that a second vehicle that approaches the first vehicle fast in the same lane has detected the first vehicle and will adjust its speed to the speed of the first vehicle.

10 Claims, No Drawings

METHOD AND DEVICE FOR AN OVERTAKING ASSISTANT

FIELD OF THE INVENTION

The invention relates to the technical field of driver assistance systems for motor vehicles and vehicles that move at least partially autonomously.

BACKROUND INFORMATION

Overtaking assistants for vehicles are prior art. For this purpose, the surrounding area on the sides and at the rear of a vehicle is monitored using at least one sensor system. The sensor system is in particular designed as a camera, radar, or lidar system, or as a combination of said sensors. When the driver's intention to overtake is detected, e.g. when the driver operates the turn indicator lamp, a warning is output to the driver if another vehicle is in the passing lane in the area next to or behind the vehicle.

If the method described is transferred to vehicles which perform an overtaking maneuver autonomously, there is the disadvantage that the environment sensing system working within a predetermined range will detect vehicles in the passing lane that approach the vehicle at a high relative speed very late only. A collision is in this case likely or even inevitable. This problem will be illustrated below using a numerical example.

A vehicle travels on a freeway at approximately 130 km/h. The speed can also be just 80 km/h behind a slow moving truck. Vehicles that can be licensed for use in Germany can reach a maximum speed of up to 430 km/h. This means that there can be a differential speed of up to 350 km/h (97.7 m/s) during an overtaking maneuver. Sensor ranges available today for detecting the surroundings on the sides and at the rear of the vehicle are between 60 and 200 m.

In extreme cases, the time span until a collision occurs is less than three seconds if a slow vehicle cuts into the passing lane. Even if the driver of the approaching vehicle reacts fast and can still brake, this traffic situation poses a high risk and should be avoided.

SUMMARY OF THE INVENTION

It is an object of at least one of the embodiments of the present invention to provide a method and a device for a vehicle's safe autonomous cutting into an adjacent lane.

This object can be achieved by the features of at least one of the embodiments of the invention as set forth herein.

According to the invention, a method for an overtaking assistant for a vehicle is provided. The vehicle is equipped with environment sensing systems for detecting objects in the own and an adjacent lane on the sides and at the rear of the vehicle. The space in front of the vehicle is preferably detected by environmental sensors as well. Environment sensing systems for adaptive speed control, lane departure warning, blind spot monitoring, rear area monitoring or similar driver assistance systems are known from prior art and can also be used for an overtaking assistant.

Autonomous cutting into an adjacent lane is only initiated if a first vehicle is detected in the adjacent lane. The first vehicle is taken as a reference for a speed of vehicles in the passing lane. It is also assumed that a second vehicle that approaches the first vehicle fast in the same lane has detected the first vehicle and will adjust its speed to the speed of the first vehicle.

DETAILED DESCRIPTION OF EXAMPLE EMBODIMENTS OF THE INVENTION

In a positive embodiment of the invention, an autonomous overtaking maneuver is only initiated depending on the relative speed between the vehicle and the first vehicle. The value of the relative speed must be in a predeterminable range. The predeterminable range for the relative speed can also be a function of the vehicle speed, the road conditions, and the weather.

In a preferred embodiment of the invention, the vehicle will cut into the passing lane in front of the first vehicle, for example, wherein the vehicle accelerates, if required, for cutting in in front of the first vehicle. This procedure is particularly useful if the first vehicle in the passing lane moves clearly slower or at least not faster than the vehicle.

Furthermore, this embodiment is particularly advantageous if the first vehicle moves at a speed slower than or equal to the predetermined target speed of the vehicle. The target speed of the vehicle is for example determined or set by the driver depending on the type of road or speed limits. A typical target speed for traveling on a freeway is 130 km/h. If slower vehicles move in front of the vehicle, its actual speed is adjusted to prevent a collision with the vehicle ahead. Such a speed control is also called adaptive cruise control.

Alternatively, the vehicle may cut in behind the first vehicle, wherein the vehicle slows down, if required, to cut in behind the first vehicle. This procedure is particularly useful if the speeds of the vehicle and of the first vehicle are similar. Speeds are considered similar if they do not differ by more than 20 km/h or 15 km/h or 5 km/h or 1 km/h.

In a preferred embodiment of the invention, autonomous cutting into another lane is performed only if a second vehicle is detected in addition to the first vehicle in the passing lane behind the first vehicle and a gap between the first and the second vehicles is big enough for a cutting in maneuver of the vehicle.

An autonomous overtaking maneuver is preferably performed only if the value of a relative speed between the vehicle and the second vehicle is in a predetermined range. In particular, the vehicle should not travel slower than the second vehicle or the target speed of the vehicle should not be less than the speed of the second vehicle, since the vehicle will cut in in front of the second vehicle.

In a preferred embodiment of the invention, the gap between the first and the second vehicles is greater than a predetermined threshold, in particular greater than a predetermined threshold of 40, 50, 60, 70, or 80 m.

In another embodiment of the invention, the threshold for the gap between the first and second vehicles depends on the speed of the vehicle or on the relative speed to the first vehicle or on the relative speed to the second vehicle. If speeds are lower, the vehicle may cut into a smaller gap, if speeds are higher, it may only cut into larger gaps.

The size of the gap is in particular selected such that there is a sufficient safety distance to the first and second vehicles. The safety distance can be calculated from the speed of the vehicle. The calculation of the safety distance is known to a person skilled in the art. A rule of thumb says that the distance should be half the speedometer value (in km/h). The safety distance is highly dependent on the road conditions and the weather. These can also be taken into account in the calculation. If the road is wet, the safety distance should be longer because the length of the braking distance increases.

In addition, a device for performing an autonomous overtaking maneuver for a vehicle is provided. The vehicle is equipped with environment sensing systems for detecting objects in the own and an adjacent lane in front of and behind the vehicle and with means for automatic longitudinal and transverse control. The device includes a control unit with an electronic memory in which a method as described above is stored.

The invention claimed is:

1. A method for an overtaking assistance system of a driver assistance system of a subject vehicle driving on a subject vehicle's lane of a roadway, comprising the following steps performed by the overtaking assistance system:
   receiving sensor data from an environment sensor system of the subject vehicle;
   evaluating the sensor data to determine whether at least a first other vehicle is detected in an adjacent lane that is adjacent to the subject vehicle's lane of the roadway; and
   initiating an autonomous cutting of the subject vehicle out of the subject vehicle's lane and into the adjacent lane only when at least the first other vehicle is detected in the adjacent lane, and not initiating the autonomous cutting of the subject vehicle out of the subject vehicle's lane and into the adjacent lane when at least the first other vehicle is not detected in the adjacent lane.

2. A method for a driver assistance system comprising an overtaking assistant system for a subject vehicle equipped with a sensor system for at least detecting objects in an own lane on which the subject vehicle is driving and an adjacent lane adjacent to the own lane, wherein the method comprises:
   with the sensor system determining whether at least a first other vehicle is detected in the adjacent lane, and
   with the overtaking assistant system initiating an autonomous cutting of the subject vehicle from the own lane into the adjacent lane only when at least the first other vehicle is detected in the adjacent lane, and not initiating the autonomous cutting of the subject vehicle from the own lane into the adjacent lane when at least the first other vehicle is not detected in the adjacent lane.

3. The method according to claim 2, further comprising:
   with the sensor system detecting a relative speed of the subject vehicle relative to the first other vehicle, and
   with the overtaking assistant system initiating an autonomous overtaking maneuver of the subject vehicle only when the relative speed is in a predetermined range.

4. The method according to claim 3, further comprising:
   with the sensor system detecting a vehicle speed of the subject vehicle, and
   with the overtaking assistant system setting a threshold of the predetermined range dependent on the vehicle speed.

5. The method according to claim 2, further comprising:
   with the sensor system detecting a speed of the subject vehicle and a speed of the first other vehicle, and
   with the overtaking assistant system autonomously controlling the subject vehicle to cut-in in front of the first other vehicle only when the speed of the subject vehicle is higher than or equal to the speed of the first other vehicle, and to not cut-in in front of the first other vehicle when the speed of the subject vehicle is less than the speed of the first other vehicle.

6. The method according to claim 2, further comprising:
   with the sensor system determining whether a second other vehicle in addition to the first other vehicle is detected in the adjacent lane, and when the second other vehicle is detected then further detecting a size of a gap between the first other vehicle and the second other vehicle, and
   with the overtaking assistant system performing the autonomous cutting of the subject vehicle into the adjacent lane only when the second other vehicle is detected in addition to the first other vehicle in the adjacent lane and the size of the gap between the first other vehicle and the second other vehicle is greater than or equal to a predetermined minimum gap size threshold, and not performing the autonomous cutting of the subject vehicle into the adjacent lane when the second other vehicle is not detected in addition to the first other vehicle or when the size of the gap is less than the predetermined minimum gap size threshold.

7. The method according to claim 6, wherein the predetermined minimum gap size threshold is selected from 40 m, 50 m, 60 m, 70 m, or 80 m.

8. The method according to claim 6, further comprising selecting a value of the predetermined minimum gap size threshold dependent on a speed of the subject vehicle, or dependent on a relative speed of the subject vehicle relative to the first other vehicle or relative to the second other vehicle.

9. A device for performing the method according to claim 2, comprising the sensor system and the overtaking assistant system, which includes a control unit with an electronic memory in which is stored a program configured to carry out the method when the program is executed by the control unit.

10. A vehicle comprising a vehicle body and the device according to claim 9 mounted on the vehicle body.

* * * * *